(12) United States Patent
Min et al.

(10) Patent No.: US 11,277,563 B2
(45) Date of Patent: Mar. 15, 2022

(54) CAMERA MODULE

(71) Applicant: Samsung Electro-Mechanics Co., Ltd., Suwon-si (KR)

(72) Inventors: Kyoung Joong Min, Suwon-si (KR); Seo Hyung Kim, Suwon-si (KR); Koon Shik Cho, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 198 days.

(21) Appl. No.: 16/843,146

(22) Filed: Apr. 8, 2020

(65) Prior Publication Data

US 2021/0227114 A1    Jul. 22, 2021

(30) Foreign Application Priority Data

Jan. 20, 2020   (KR) .................. 10-2020-0007298

(51) Int. Cl.
*H04N 5/232*      (2006.01)
*H04N 5/225*      (2006.01)
*G06F 1/26*       (2006.01)
*H04N 13/204*     (2018.01)
*G06F 1/16*       (2006.01)

(52) U.S. Cl.
CPC ......... *H04N 5/2328* (2013.01); *G06F 1/1686* (2013.01); *G06F 1/26* (2013.01); *H04N 5/2254* (2013.01); *H04N 5/2258* (2013.01); *H04N 5/23212* (2013.01); *H04N 5/23258* (2013.01); *H04N 13/204* (2018.05)

(58) Field of Classification Search
None
See application file for complete search history.

(56) References Cited

U.S. PATENT DOCUMENTS

| 2011/0134250 | A1* | 6/2011 | Kim ................. G06F 3/017 348/164 |
| 2013/0235222 | A1* | 9/2013 | Karn ................. H04N 5/232411 348/211.2 |
| 2014/0333725 | A1* | 11/2014 | Park .................... H04N 13/296 348/46 |

(Continued)

FOREIGN PATENT DOCUMENTS

| KR | 10-2013-0077216 A | 7/2013 |
| KR | 10-2017-0019753 A | 2/2017 |

(Continued)

*Primary Examiner* — William B Perkey
(74) *Attorney, Agent, or Firm* — NSIP Law

(57) ABSTRACT

A camera module includes a gyro sensor generating shaking data, a first driver integrated circuit (IC) generating a driving signal to move a first lens barrel in one or more directions perpendicular to an optical axis direction, in response to the shaking data provided by the gyro sensor, and a second driver IC generating a driving signal to move a second lens barrel in one or more directions perpendicular to the optical axis direction, in response to the shaking data provided by the gyro sensor. Each of the first driver IC and the second driver IC operates in a normal mode and a low power mode, and when the first driver IC operates in the low power mode, whether to activate a communication path of the shaking data in the first driver IC is determined in response to a mode of the second driver IC.

20 Claims, 3 Drawing Sheets

(56) References Cited

U.S. PATENT DOCUMENTS

| | | | | |
|---|---|---|---|---|
| 2018/0013955 | A1* | 1/2018 | Kim | H04N 5/44504 |
| 2018/0241922 | A1* | 8/2018 | Baldwin | H04N 5/23241 |
| 2019/0227617 | A1* | 7/2019 | Sugimoto | H04N 5/23254 |
| 2019/0364221 | A1* | 11/2019 | Jin | H04N 5/22521 |
| 2020/0084387 | A1* | 3/2020 | Baldwin | H04N 5/33 |
| 2021/0227114 | A1* | 7/2021 | Min | H04N 5/2254 |

FOREIGN PATENT DOCUMENTS

| | | |
|---|---|---|
| KR | 10-2018-0005543 A | 1/2018 |
| KR | 10-1888967 B1 | 8/2018 |

* cited by examiner

CAMERA MODULE

CROSS-REFERENCE TO RELATED APPLICATIONS

This application claims the benefit under 35 USC 119(a) of Korean Patent Application No. 10-2020-0007298 filed on Jan. 20, 2020, in the Korean Intellectual Property Office, the entire disclosure of which is incorporated herein by reference for all purposes.

BACKGROUND

1. Field

The present disclosure relates to a camera module.

2. Description of the Background

In general, portable communication terminals such as mobile phones, personal digital assistants (PDAs), portable personal computers (PCs), and the like, have recently become commonly used to transmit image data as well as text or voice data. In order to respond to this trend, to enable image data transmission, image chatting, and the like, camera modules have become standard in portable communication terminals in recent years.

In general, a camera module includes a lens barrel having a lens therein and a housing accommodating the lens barrel therein, and includes an image sensor for converting an image of a subject into an electrical signal. A smart phone may employ a camera module using a short-focusing method for photographing an object with fixed focus, but recently, an actuator capable of autofocusing (AF) adjustment has been employed, according to technological developments. In addition, such a camera module may employ an actuator for an optical image stabilization (OIS) function to reduce a resolution degradation phenomenon caused by shaking.

Recently, in order to implement a high-performance camera function, a camera module having a plurality of lens barrels has been mounted on an electronic device. In order to improve an autofocusing function of each of the plurality of lens barrels and to reduce a resolution degradation phenomenon, it has been necessary to provide different actuators to each of the plurality of lens barrels.

For stable driving of different actuators, different gyro sensors providing shaking data to each of the different actuators and different memories providing firmware data to each of the different actuators need to be provided, but when the camera module is provided with a plurality of gyro sensors and a plurality of memories, there is a problem that manufacturing costs and a size thereof may increase.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a gyro sensor generating shaking data, a first driver integrated circuit (IC) generating a driving signal to move a first lens barrel in one or more directions perpendicular to an optical axis direction, in response to the shaking data provided by the gyro sensor, and a second driver IC generating a driving signal to move a second lens barrel in one or more directions perpendicular to the optical axis direction, in response to the shaking data provided by the gyro sensor, wherein each of the first driver IC and the second driver IC operates in a normal mode and a low power mode, and when the first driver IC operates in the low power mode, whether to activate a communication path of the shaking data in the first driver IC is determined, in response to a mode of the second driver IC.

The communication path of the shaking data in the first driver IC may be formed between a first communication port of the first driver IC connected to the gyro sensor and a second communication port of the first driver IC connected to the second driver IC.

When the first driver IC operates in the low power mode, and the second driver IC operates in the normal mode, the communication path of the shaking data in the first driver IC may be activated.

Power may be supplied to the first communication port and the second communication port.

When the first driver IC operates in the low power mode and the second driver IC operates in the low power mode, the communication path of the shaking data in the first driver IC may be deactivated.

A power supply may be cut off to the first communication port and the second communication port.

The gyro sensor and the first driver IC may perform a serial peripheral interface bus (SPI) communication.

The first communication port of the first driver IC may include a master port in SPI communication.

The first driver IC and the second driver IC may perform a serial peripheral interface bus (SPI) communication.

The second communication port of the first driver IC may include a slave port in SPI communication.

The first driver IC may include a nonvolatile memory storing first firmware data and second firmware data, the second driver IC may include a volatile memory storing the second firmware data transmitted from the first driver IC, and when the second driver IC operates in the low power mode, the volatile memory may maintain the stored second firmware data.

The first driver IC may generate a driving signal to move the first lens barrel to a target position according to the first firmware data, and the second driver IC may generate a driving signal to move the second lens barrel to a target position according to the second firmware data.

In another general aspect, a camera module includes a first driver integrated circuit (IC) including a nonvolatile memory storing first firmware data and second firmware data, the first driver IC generating a driving signal to move a first lens barrel to a target position according to the first firmware data, and a second driver IC including a volatile memory storing the second firmware data transmitted from the first driver IC, the second driver IC generating a driving signal to move a second lens barrel to a target position according to the second firmware data, wherein each of the first driver IC and the second driver IC operates in a normal mode and a low power mode, and when the second driver IC operates in the low power mode, the volatile memory maintains the stored second firmware data.

When the second driver IC operates in the low power mode, power may be supplied to the volatile memory.

When the second driver IC operates in the low power mode, a power supply may be cut off to the second driver IC except for the volatile memory.

The nonvolatile memory may include one or more of a flash memory and an electrically erasable programmable read-only memory (EEPROM).

The volatile memory may include a static random access memory (SRAM).

The camera module may further include a gyro sensor generating shaking data, wherein the first driver IC may generate a driving signal to move the first lens barrel in one or more directions perpendicular to an optical axis direction, in response to the shaking data provided by the gyro sensor, wherein the second driver IC may generate a driving signal to move the second lens barrel in one or more directions perpendicular to the optical axis direction, in response to the shaking data provided by the gyro sensor, and wherein when the first driver IC operates in the low power mode, whether to activate a communication path of the shaking data in the first driver IC may be determined in response to a mode of the second driver IC.

The communication path of the shaking data in the first driver IC may be formed between a first communication port of the first driver IC connected to the gyro sensor and a second communication port of the first driver IC connected to the second driver IC.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
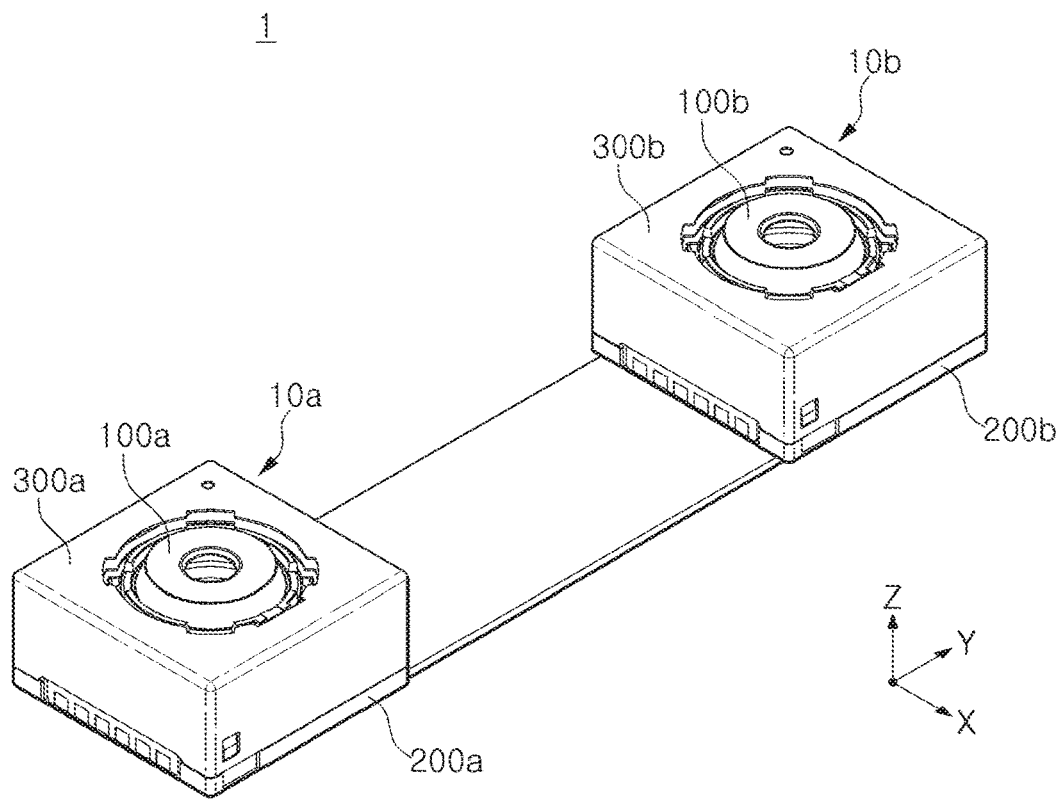
FIG. 1 is a perspective view of a camera module according to one or more examples of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

An aspect of the present disclosure is to provide a camera module that shares a memory for storing a gyro sensor and firmware data to which different driver ICs provide shaking data.

FIG. 1 is a perspective view of a camera module according to one or more examples of the present disclosure.

Referring to FIG. 1, a camera module 1 according to an example of the present disclosure includes a first camera module 10a including a first lens barrel 100a, a first housing 200a accommodating the first lens barrel 100a, and a first case 300a coupled to the first housing 200a; and a second camera module 10b including a second lens barrel 100b, a second housing 200b accommodating the second lens barrel 100b, and a second case 300b coupled to the second housing 200b.

The first camera module 10a and the second camera module 10b may be mounted on one printed circuit board, or may be mounted on different printed circuit boards according to the examples described herein.

Since configurations of the first camera module 10a and the second camera module 10b are similar, the first camera module 10a will mainly be described, and redundant descriptions applicable to the second camera module 10b may be omitted.

The first lens barrel 100a may be formed in a hollow cylindrical shape, and a plurality of lenses for capturing a subject may be accommodated therein, and the plurality of lenses may be mounted on the first lens barrel 100a in an optical axis direction. As many of the plurality of lenses as necessary may be disposed according to a design of the first lens barrel 100a, and each lens may have optical characteristics such as the same or a different refractive index.

The first camera module 10a may further include an image sensor for converting light incident through the first lens barrel 100a into an electrical signal. The image sensor may be disposed below the first housing 200a. The image sensor may convert light incident through the first lens barrel 100a into an electrical signal. The image sensor may include a charge coupled device (CCD), a complementary metal-oxide semiconductor (CMOS), or the like, and combinations thereof. The electrical signal converted by the image sensor may be output as an image through a display unit of the electronic device. The image sensor may be fixed to the printed circuit board and may be electrically connected to the printed circuit board by wire bonding.

An infrared light filter may be provided above the image sensor. The infrared light filter may block light in an infrared region among light incident through the first lens barrel 100a.

The first camera module 10a may include a first actuator for driving the first lens barrel 100a in an optical axis direction and two directions, perpendicular to the optical axis direction. The first actuator may include an auto focus (AF) actuator for adjusting a focus and an optical image stabilization (OIS) actuator for correcting shaking.

For example, the AF actuator may adjust the focus by moving the first lens barrel 100a in the optical axis direction (Z axis direction), and the OIS actuator may correct shaking during shooting by moving the first lens barrel 100a in two directions, perpendicular to the optical axis direction (X axis direction and Y axis direction).

The first housing 200a may be formed to have open upper and lower portions, and the first lens barrel 100a and the first actuator may be accommodated in an internal space of the first housing 200a. The first case 300a may be coupled to the first housing 200a to surround the upper portion of the first housing 200a, and may protect internal components of the first camera module 10a. In addition, the first case 300a may shield electromagnetic waves so that electromagnetic waves generated by the camera module do not affect other electronic components in the electronic device. In addition, the first case 300a may shield electromagnetic waves so that electromagnetic waves generated by other electronic components do not affect the camera module.

Figure 2:
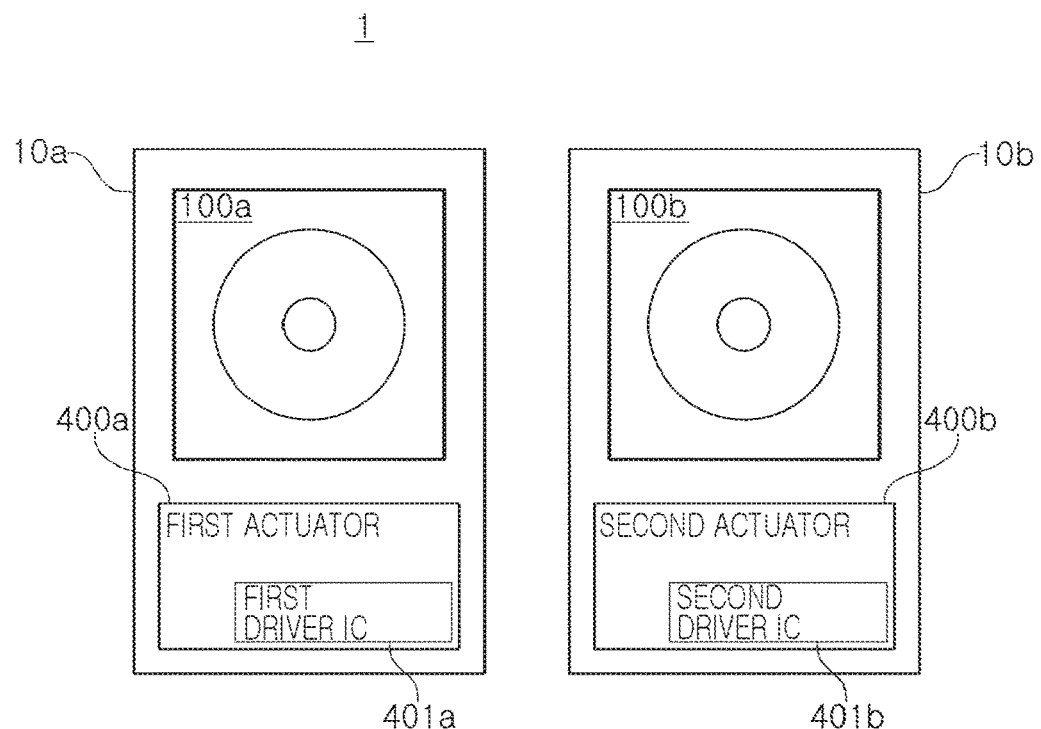
FIG. 2 is a block diagram of a camera module according to one or more examples of the present disclosure.

FIG. 2 is a block diagram of a camera module according to one or more examples of the present disclosure.

Referring to FIG. 2, a camera module 1 according to an example of the present disclosure may include a first camera module 10a including a first lens barrel 100a and a first actuator 400a for driving the first lens barrel 100a in an optical axis direction and a direction perpendicular to the optical axis; and a second camera module 10b including a second lens barrel 100b and a second actuator 400b for driving the second lens barrel 100b in an optical axis direction and a direction perpendicular to an optical axis. The first actuator 400a may include a first driver integrated circuit (IC) 401a, and the second actuator 400b may include a second driver IC 401b.

Figure 3:
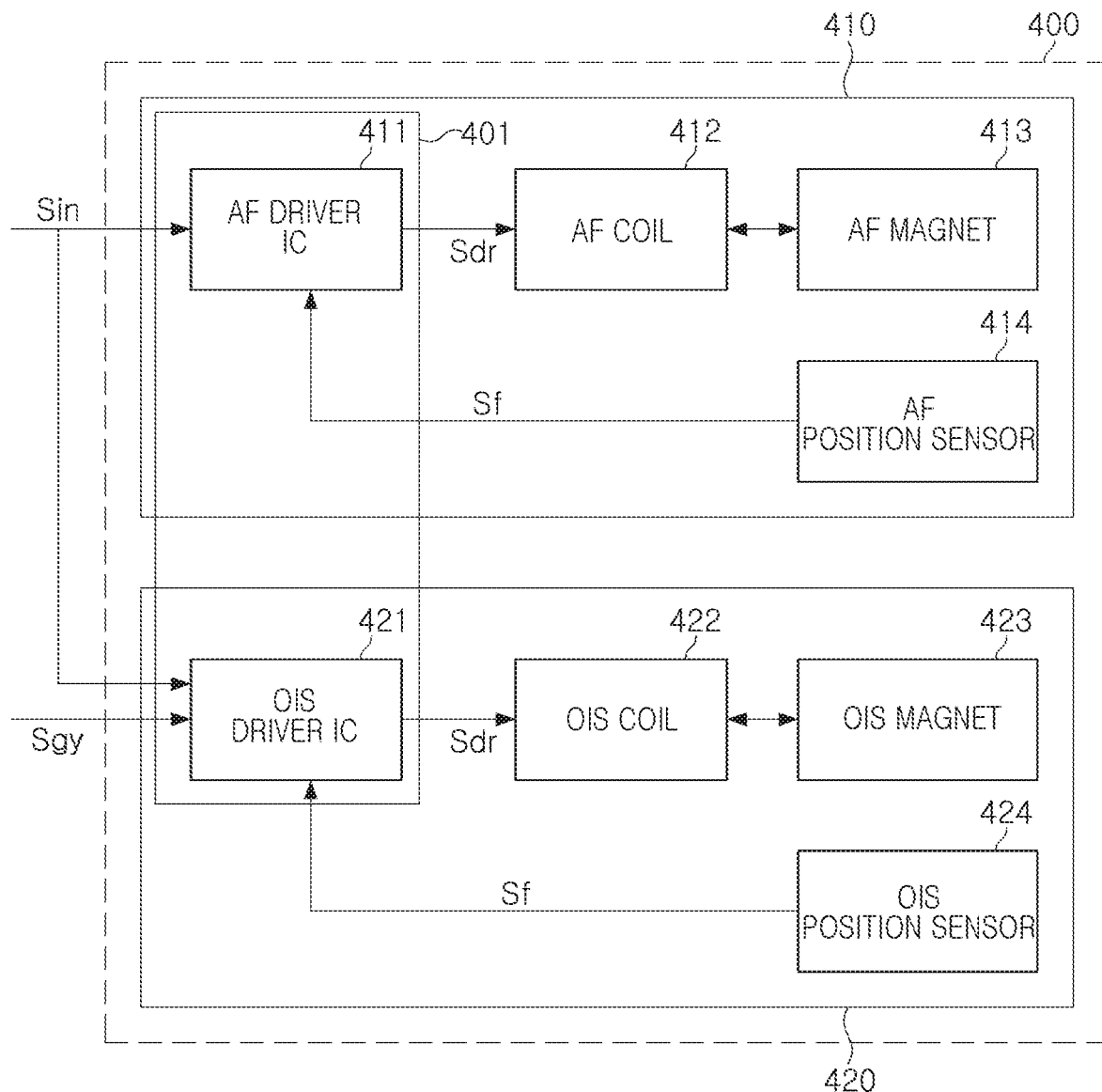
FIG. 3 is a block diagram of an actuator according to one or more examples of the present disclosure.

FIG. 3 is a block diagram of an actuator according to one or more examples of the present disclosure. Hereinafter, a driving method of the actuator according to one or more examples of the present disclosure will be described in detail with reference to FIGS. 1 to 3.

An actuator 400 according to an example of FIG. 3 may correspond to any one of the first actuator 400a and the second actuator 400b shown in FIG. 2.

Referring to FIG. 3, the actuator 400 according to an example of the present disclosure includes an AF actuator 410 and an OIS actuator 420.

The AF actuator 410 includes an AF driver IC 411, an AF coil 412, an AF magnet 413, and an AF position sensor 414, and the OIS actuator 420 includes an OIS driver IC 421, an OIS coil 422, an OIS magnet 423, and an OIS position sensor 424.

A driver IC 401 may include the AF driver IC 411 of the AF actuator 410 and the OIS driver IC 421 of the OIS actuator 420, and the driver IC 401 may correspond to any one of the first driver IC 401a and the second driver IC 401b shown in FIG. 2.

The AF driver IC 411 may generate a driving signal Sdr according to an input signal Sin and a feedback signal Sf, and may provide the generated driving signal Sdr to the AF coil 412. For example, the input signal Sin may be disposed inside an electronic device employing a camera module, and may be provided by a host that controls an overall operation of the electronic device. The input signal Sin provided to the AF driver IC 411 may include information regarding a target position in the optical axis direction of the lens barrel.

The feedback signal Sf may be provided by the AF position sensor 414 which detects a current position of the lens barrel in the optical axis direction. For example, the AF position sensor 414 may include a hall element. The AF position sensor 414 may detect the current position of the lens barrel, through a current position of the AF magnet 413.

The AF driver IC 411 may be driven in a closed loop-type manner that compares the input signal Sin with the feedback signal Sf. The closed loop-type AF driver IC 411 may be driven in a direction to reduce an error between a target position included in the input signal Sin and a current position detected in the feedback signal Sf. Driving in a closed loop-type manner may be advantageous in that linearity, accuracy, and repeatability may be improved, compared to an open loop system.

The AF driver IC 411 may include an H bridge circuit capable of being driven in both directions to provide a driving signal Sdr to the AF coil 412 in a voice coil motor manner. The driving signal Sdr may be provided to the AF coil 412 in a form of a current or a voltage.

When the driving signal Sdr is applied to the AF coil 412, a lens barrel may move in the optical axis direction due to electromagnetic influence between the AF magnet 413 and the AF coil 412. For example, the AF magnet 413 may be mounted on one side of the lens barrel, and the AF coil 412 may be mounted on the housing to face the AF magnet 413. However, according to an example, the positions of the AF magnet 413 and the AF coil 412 may be changed with each other.

The OIS driver IC 421 may generate a driving signal Sdr according to an input signal Sin, a gyro signal Sgy, and a feedback signal Sf, and may provide the generated driving signal Sdr to the OIS coil 422.

For example, the input signal Sin may be disposed inside an electronic device employing a camera module, and may be provided by a host that controls an overall operation of the electronic device. The input signal Sin provided to the OIS driver IC 421 may include information regarding a target position in a direction perpendicular to the optical axis of the lens barrel.

The gyro signal Sgy may be disposed in the camera module, and may be provided by a gyro sensor that detects shaking of the camera module or the electronic device. For example, the gyro signal Sgy may include shaking data. For example, the gyro data may include acceleration data and angular velocity data detected from shaking of the camera module or the electronic device.

The feedback signal Sf may be provided by the OIS position sensor 424 which detects a current position in a direction perpendicular to the optical axis of the lens barrel. For example, the OIS position sensor 424 may include a hall element. The OIS position sensor 424 may detect the current position of the lens barrel through the current position of the OIS magnet 423.

The OIS driver IC 421 may be driven in a closed loop-type comparing the input signal Sin, the gyro signal Sgy, and the feedback signal Sf. The closed loop-type OIS driver IC 421 may be driven in a direction reducing an error of a target position included in the input signal Sin, shaking information included in the gyro signal Sgy, and a current position detected in the feedback signal Sf. Driving in the closed loop-type manner may be advantageous in that linearity, accuracy, and repeatability may be improved compared to an open loop system.

The OIS driver IC 421 may include an H bridge circuit capable of being driven in both directions to provide a driving signal Sdr to the OIS coil 422 in a voice coil motor manner. The driving signal Sdr may be provided to the OIS coil 422 in a form of a current or a voltage.

When the driving signal Sdr is applied to the OIS coil 422, the lens barrel may move in a direction perpendicular to the optical axis due to the electromagnetic influence between the OIS magnet 423 and the OIS coil 422. For example, two OIS magnets 423 are provided, one OIS magnet is mounted on the lens barrel, in a first direction perpendicular to the optical axis, and the other OIS magnet is mounted on the lens barrel, in a second direction perpendicular to the optical axis. In addition, two OIS coils 422 may be provided to each face a respective OIS magnet 423. However, in some examples, the positions of the OIS magnet 423 and the OIS coil 422 may be changed. For example, one or more OIS coils 422 may be disposed on the lens barrel and one or more OIS magnets 423 may be disposed to each face a respective OIS coil 422.

For stable driving of the first actuator 400a and the second actuator 400b of the camera module 1, two memories storing the firmware data of each of the first driver IC 401a and the second driver IC 401b are required, and two gyro sensors for providing shaking data to each of the first driver IC 401a and the second driver IC 401b may be required.

However, in order to reduce manufacturing costs of the camera module or the electronic device, and reduce the size thereof, the number of memories storing firmware data and the number of gyro sensors for providing shaking data need to be limited.

Figure 4:
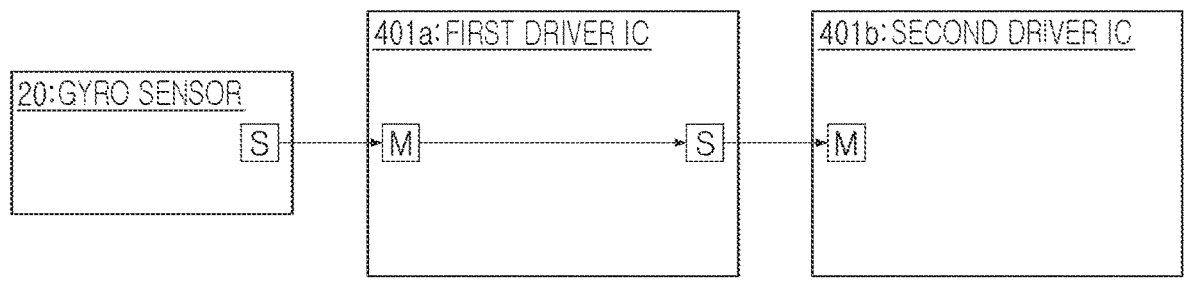
FIG. 4 is a block diagram of a first driver integrated circuit (IC), a second driver IC, and a gyro sensor provided to illustrate a method of communicating shaking data according to one or more examples of the present disclosure.

FIG. 4 is a block diagram of a first driver IC, a second driver IC, and a gyro sensor provided to illustrate a method of communicating shaking data according to one or more examples of the present disclosure.

Although not shown in FIG. 4, each of the first driver IC 401a and the second driver IC 401b may include a microcontroller unit (MCU). It can be understood that operations of the first driver IC 401a and the second driver IC 401b to be described later are performed by a microcontroller unit (MCU) provided in each of the first driver IC 401a and the second driver IC 401b.

Referring to FIG. 4, the first driver IC 401a is connected to a gyro sensor 20, and the first driver IC 401a is connected to the second driver IC 401b. The gyro sensor 20 corresponds to one component of the camera module or the electronic device.

The shaking data generated by the gyro sensor 20 may be transferred to the first driver IC 401a, and the second driver IC 401b may receive the shaking data generated by the gyro sensor 20, through the first driver IC 401a. Each of the first driver IC 401a and the second driver IC 401b may perform an OIS operation, using shaking data.

Each of the gyro sensor 20 and the first driver IC 401a may be provided with a communication port, and may be connected through a communication line. In addition, each of the first driver IC 401a and the second driver IC 401b may be provided with a communication port, and may be connected through a communication line. A communication port connected to the gyro sensor 20 among the communication ports of the first driver IC 401a may be referred to as a first communication port, and a communication port connected to the second driver IC 401b may be referred to as a second communication port.

The gyro sensor 20 and the first driver IC 401a may be connected through a serial peripheral interface bus (SPI) communication line, to perform SPI communication.

In the communication of shaking data between the gyro sensor 20 and the first driver IC 401a, the first driver IC 401a operates as a master in the SPI communication, and the gyro sensor 20 operates as a slave in the SPI communication. The first communication port of the first driver IC 401a includes a master port M, and the communication port of the gyro sensor 20 includes a slave port S.

In FIG. 4, the master port M and the slave port S are schematically illustrated, but the master port M and the slave port S may include a master in slave out (MISO) pin, a master out slave in (MOSI) pin, a serial clock (SCLK) pin, and a slave select (SS) pin.

In the SPI communication, an operation of transferring specific data of the slave in the SPI communication to the master in the SPI communication may be understood as an operation of reading the specific data from the slave in the SPI communication.

The first driver IC 401a and the second driver IC 401b may be connected through a serial peripheral interface bus (SPI) communication line to perform SPI communication.

In the communication of the shaking data between the first driver IC 401a and the second driver IC 401b, the second driver IC 401b operates as a master in SPI communication, and the first driver IC 401a is a slave in SPI communication. A communication port of the second driver IC 401b includes a master port M, and a second communication port of the first driver IC 401a includes a slave port S. The master port M and the slave port S of the first driver IC may be electrically connected inside the first driver IC 401a to form a communication path of the shaking data in the first driver IC 401a.

According to an example of the present disclosure, the second driver IC 401b may perform an OIS operation by using shaking data transmitted from the gyro sensor 20, through the first driver IC 401a, thereby reducing the number of gyro sensors.

When necessary to perform a low specification camera function, or to reduce power consumption, one camera module of the first camera module 10a and the second camera module 10b may operate in a normal node, and the other camera module may operate in a low power mode. Accordingly, each of the first driver IC 401a and the second driver IC 401b may operate in one of a normal mode and a low power mode. Here, the normal mode may be understood as a mode in which sufficient power is supplied for driving the driver IC, and the low power mode may be understood as a mode in which power is cut off or minimum power is supplied for limiting driving the driver IC. The driver IC operating in the normal mode or the low power mode may be changed in a mode by an interrupt signal provided by a host.

However, as described above, when the second driver IC 401b receives shaking data from the gyro sensor 20 through the first driver IC 401a, in the low power mode operation of the first driver IC 401a, when the supply of power to the first driver IC 401a is cut off, the second driver IC 401b may not receive shaking data.

According to an example of the present disclosure, when the first driver IC 401a operates in the low power mode, whether to activate a communication path of the shaking data in the first driver IC 401a may be determined according to the mode of the second driver IC 401b. Here, the communication path of the shaking data in the first driver IC 401a may be formed between the master port M and the slave port S of the first driver IC 401a.

When the first driver IC 401a operates in the low power mode, and the second driver IC 401b operates in the normal mode, the communication path of the shaking data in the first driver IC 401a may be activated. For example, power may be supplied to the master port M and the slave port S of the first driver IC 401a, such that the communication path of the shaking data in the first driver IC 401a may be activated. In this case, power may be cut off to remaining components, other than the master port M and the slave port S of the first driver IC 401a, for example, to a microcontroller unit (MCU) of the first driver IC 401a.

When the first driver IC 401a operates in the low power mode, and the second driver IC 401b operates in the low power mode, the communication path of the shaking data in the first driver IC 401a may be deactivated. For example, a power supply may be cut off to the master port M and the slave port S of the first driver IC 401a, such that the communication path of the shaking data in the first driver IC 401a may be deactivated. In this case, power may be cut off to remaining components other than the master port M and the slave port S of the first driver IC 401a, for example, to the microcontroller unit (MCU) of the first driver IC 401a.

Figure 5:
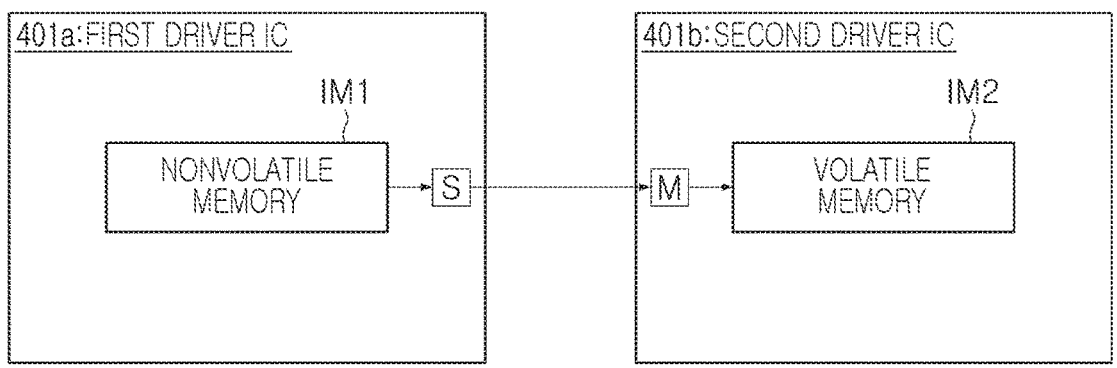
FIG. 5 is a block diagram of a first driver IC and a second driver IC provided to illustrate a method of communicating of firmware data according to one or more examples of the present disclosure.

FIG. 5 is a block diagram of a first driver IC and a second driver IC provided to illustrate a method of communicating firmware data according to one or more examples of the present disclosure.

Referring to FIG. 5, each of the first driver IC 401a and the second driver IC 401b may be provided with a communication port, and may be connected through a communication line.

For example, the first driver IC 401a and the second driver IC 401b may be connected through a serial peripheral interface bus (SPI) communication line, to perform SPI communication.

In the communication of the firmware data of the first driver IC 401a and the second driver IC 401b, the second driver IC 401b operates as a master in SPI communication, and the first driver IC 401a operates as a slave in SPI communication. A communication port of the second driver IC 401b includes a master port M, and a communication port of the first driver IC 401a includes a slave port S.

The first driver IC 401a includes a nonvolatile memory IM1 storing firmware data. The firmware data stored in the nonvolatile memory IM1 may include first firmware data for driving the first driver IC 401a and second firmware data for driving the second driver IC 401b. For example, each of the first firmware data and the second firmware data may include data for an auto focus (AF) adjustment and an optical image stabilization (OIS).

For example, the nonvolatile memory IM1 of the first driver IC 401a may include one of a flash memory and an electrically erasable programmable read-only memory (EEPROM). Since the nonvolatile memory IM1 of the first driver IC 401a is implemented as a flash memory, even when power is not supplied to the first driver IC 401a, firmware data stored in the flash memory may be maintained.

The second driver IC 401b may include a volatile memory IM2. The second firmware data stored in the nonvolatile memory IM1 of the first driver IC 401a may be transferred to the second driver IC 401b, and may be stored in the volatile memory IM2. For example, the second driver IC 401b may read the second firmware data stored in the nonvolatile memory IM1 of the first driver IC 401a and store the second firmware data in the volatile memory IM2 at a start point of driving. Here, the start point of driving of the second driver IC 401b may be understood as a time when power is supplied to the camera module 1.

For example, the volatile memory IM2 of the second driver IC 401b may include a static random access memory (SRAM). The volatile memory IM2 of the second driver IC 401b may be implemented as SRAM, such that the size of the memory may be reduced, and the volatile memory IM2 may operate at a high speed, such that the second driver IC 401b may be driven rapidly.

In the communication of the firmware data of the first driver IC 401a and the second driver IC 401b, it is illustrated that the first driver IC 401a and the second driver IC 401b are connected through a serial peripheral interface bus (SPI) communication line, but according to an example, the first driver IC 401a and the second driver IC 401b may be connected through an inter integrated circuit (I2C) line to perform an inter integrated circuit (I2C) communication.

According to an example of the present disclosure, the first driver IC 401a may include a nonvolatile memory, and the second driver IC 401b may include a volatile memory, thereby reducing the number of expensive nonvolatile memories, and reducing manufacturing costs thereof.

When it is necessary to perform a low specification camera function or reduce power consumption, one camera module of the first camera module 10a and the second camera module 10b may operate in a normal mode, and the other camera module of the first camera module 10a and the second camera module 10b may operate in a low power mode. Therefore, each of the first driver IC 401a and the second driver IC 401b may operate in one of a normal mode and a low power mode. Here, the normal mode may be understood as a mode in which sufficient power is supplied for driving the driver IC, and the low power mode may be understood as a mode in which a power supply is cut off or minimum power is supplied to limit driving of the driver IC. The driver IC operating in the normal mode or the low power mode may be changed in a mode by an interrupt signal provided by a host.

However, when the second driver IC 401b operates in the low power mode, if a power supply to the second driver IC 401b is cut off, since when the second driver IC 401b enters the normal mode again, the second firmware data must be received again, there is a problem that excessive time may be required for driving.

According to an example of the present disclosure, when the second driver IC 401b operates in the low power mode, power may be supplied to the volatile memory IM2 of the second driver IC 401b, such that the second firmware data stored in the volatile memory IM2 may be maintained. Meanwhile, the power supply may be cut off to components other than the volatile memory IM2 of the second driver IC 401b, for example, to the master port M of the second driver IC 401b and the microcontroller unit (MCU) of the second driver IC 401b.

Thus, even when the second driver IC 401b operates in the low power mode, when the second driver IC 401b enters the normal mode again, since the second firmware data does not need to be received again, the time required for driving may be reduced.

As set forth above, according to a camera module according to various examples of the present disclosure, different driver ICs may share a memory for storing a gyro sensor and firmware data for providing shaking data, thereby reducing a manufacturing cost of the camera module, and a size of the camera module.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
    a gyro sensor generating shaking data;
    a first driver integrated circuit (IC) generating a driving signal to move a first lens barrel in one or more directions perpendicular to an optical axis direction, in response to the shaking data provided by the gyro sensor; and
    a second driver IC generating a driving signal to move a second lens barrel in one or more directions perpendicular to the optical axis direction, in response to the shaking data provided by the gyro sensor,
    wherein each of the first driver IC and the second driver IC operates in a normal mode and a low power mode, and
    wherein when the first driver IC operates in the low power mode, whether to activate a communication path of the shaking data in the first driver IC is determined in response to a mode of the second driver IC.

2. The camera module of claim 1, wherein the communication path of the shaking data in the first driver IC is formed between a first communication port of the first driver IC connected to the gyro sensor and a second communication port of the first driver IC connected to the second driver IC.

3. The camera module of claim 2, wherein when the first driver IC operates in the low power mode, and the second driver IC operates in the normal mode, the communication path of the shaking data in the first driver IC is activated.

4. The camera module of claim 3, wherein power is supplied to the first communication port and the second communication port.

5. The camera module of claim 2, wherein when the first driver IC operates in the low power mode and the second driver IC operates in the low power mode, the communication path of the shaking data in the first driver IC is deactivated.

6. The camera module of claim 5, wherein a power supply is cut off to the first communication port and the second communication port.

7. The camera module of claim 2, wherein the gyro sensor and the first driver IC perform a serial peripheral interface bus (SPI) communication.

8. The camera module of claim 7, wherein the first communication port of the first driver IC comprises a master port in SPI communication.

9. The camera module of claim 2, wherein the first driver IC and the second driver IC perform a serial peripheral interface bus (SPI) communication.

10. The camera module of claim 9, wherein the second communication port of the first driver IC comprises a slave port in SPI communication.

11. The camera module of claim 1, wherein the first driver IC comprises a nonvolatile memory storing first firmware data and second firmware data,
    wherein the second driver IC comprises a volatile memory storing the second firmware data transmitted from the first driver IC, and
    wherein when the second driver IC operates in the low power mode, the volatile memory maintains the stored second firmware data.

12. The camera module of claim 11, wherein the first driver IC generates a driving signal to move the first lens barrel to a target position according to the first firmware data, and
  wherein the second driver IC generating a driving signal to move the second lens barrel to a target position according to the second firmware data.

13. A camera module comprising:
  a first driver integrated circuit (IC) comprising a nonvolatile memory storing first firmware data and second firmware data, the first driver IC generating a driving signal to move a first lens barrel to a target position according to the first firmware data; and
  a second driver IC comprising a volatile memory storing the second firmware data transmitted from the first driver IC, the second driver IC generating a driving signal to move a second lens barrel to a target position according to the second firmware data,
  wherein each of the first driver IC and the second driver IC operates in a normal mode and a low power mode, and
  wherein when the second driver IC operates in the low power mode, the volatile memory maintains the stored second firmware data.

14. The camera module of claim 13, wherein when the second driver IC operates in the low power mode, power is supplied to the volatile memory.

15. The camera module of claim 14, wherein when the second driver IC operates in the low power mode, a power supply is cut off to the second driver IC except for the volatile memory.

16. The camera module of claim 13, wherein the nonvolatile memory comprises one or more of a flash memory and an electrically erasable programmable read-only memory (EEPROM).

17. The camera module of claim 13, wherein the volatile memory comprises a static random access memory (SRAM).

18. The camera module of claim 13, wherein the first driver IC and the second driver IC perform a serial peripheral interface bus (SPI) communication.

19. The camera module of claim 13, further comprising a gyro sensor generating shaking data,
  wherein the first driver IC generates a driving signal to move the first lens barrel in one or more directions perpendicular to an optical axis direction, in response to the shaking data provided by the gyro sensor,
  wherein the second driver IC generates a driving signal to move the second lens barrel in one or more directions perpendicular to the optical axis direction, in response to the shaking data provided by the gyro sensor, and
  wherein when the first driver IC operates in the low power mode, whether to activate a communication path of the shaking data in the first driver IC is determined in response to a mode of the second driver IC.

20. The camera module of claim 19, wherein the communication path of the shaking data in the first driver IC is formed between a first communication port of the first driver IC connected to the gyro sensor and a second communication port of the first driver IC connected to the second driver IC.

* * * * *